(12) United States Patent
Yanagihara et al.

(10) Patent No.: US 8,715,049 B2
(45) Date of Patent: May 6, 2014

(54) GAME DEVICE, METHOD OF CONTROLLING A GAME DEVICE, AND INFORMATION STORAGE MEDIUM

(75) Inventors: Hideki Yanagihara, Minato-ku (JP); Masaki Yoshino, Minato-ku (JP); Hiroyuki Watanabe, Minato-ku (JP); Yoshitsugu Hirai, Kanagawa (JP); Yuta Taki, Minato-ku (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 455 days.

(21) Appl. No.: 13/074,435

(22) Filed: Mar. 29, 2011

(65) Prior Publication Data

US 2011/0244934 A1 Oct. 6, 2011

(30) Foreign Application Priority Data

Mar. 31, 2010 (JP) ................... 2010-080681

(51) Int. Cl.
*A63F 9/00* (2006.01)
*A63F 13/00* (2014.01)
*G06F 17/00* (2006.01)
*G06F 19/00* (2011.01)

(52) U.S. Cl.
USPC .............................................. 463/7

(58) Field of Classification Search
USPC ........................................... 463/1, 7
See application file for complete search history.

(56) References Cited

U.S. PATENT DOCUMENTS 6,149,520 A 11/2000 Takatsuka
2003/0144045 A1* 7/2003 Fujita ................. 463/1

FOREIGN PATENT DOCUMENTS

JP 10-113471 A 5/1998

* cited by examiner

*Primary Examiner* — Omkar Deodhar
*Assistant Examiner* — Reginald Renwick
(74) *Attorney, Agent, or Firm* — Sughrue Mion, PLLC

(57) ABSTRACT

A first selecting section selects any one of a plurality of movement control information items. Relationship information between a first game character and a second game character in possession of a moving object is acquired. A second selecting section selects any one of the plurality of movement control information items based on a selection result obtained by the first selecting section and the relationship information. The first game character moves based on the movement control information selected by one of the first and second selecting sections. The second game character performs an action for moving the moving object toward a target position based on the movement control information selected by another one of the first and second selecting sections.

11 Claims, 10 Drawing Sheets

FIG.6

| PLAYER ID | POSITION | POSTURE | OPERATION TARGET FLAG | BALL-KEEPING FLAG | ... |
|---|---|---|---|---|---|
| P101 | --- | --- | 0 | 0 | ... |
| P102 | --- | --- | 0 | 0 | ... |
| ... | ... | ... | ... | ... | ... |
| P110 | --- | --- | 1 | 1 | ... |
| P111 | --- | --- | 0 | 0 | ... |
| P201 | --- | --- | 0 | 0 | ... |
| P202 | --- | --- | 0 | 0 | ... |
| ... | ... | ... | ... | ... | ... |
| P210 | --- | --- | 0 | 0 | ... |
| P211 | --- | --- | 0 | 0 | ... |

FIG.7

| PLAYER CHARACTER COMBINATION | COOPERATIVENESS PARAMETER (p) |
|---|---|
| P101, P102 | 32 |
| P101, P103 | 68 |
| ... | ... |
| P110, P111 | 97 |

FIG.8

| SITUATION CONDITION | MOVEMENT PATTERN INFORMATION |
|---|---|
| SITUATION CONDITION 1 | MOVEMENT PATTERN INFORMATION 1-1 |
| | MOVEMENT PATTERN INFORMATION 1-2 |
| | MOVEMENT PATTERN INFORMATION 1-3 |
| | MOVEMENT PATTERN INFORMATION 1-4 |
| SITUATION CONDITION 2 | MOVEMENT PATTERN INFORMATION 2-1 |
| | MOVEMENT PATTERN INFORMATION 2-2 |
| | MOVEMENT PATTERN INFORMATION 2-3 |
| | |

FIG.9

| COOPERATIVENESS PARAMETER (p) | PROBABILITY INFORMATION | |
|---|---|---|
| | PROBABILITY (P1) | PROBABILITY (P2) |
| $0 \leq p < 30$ | 50 | 50 |
| $30 \leq p < 70$ | 65 | 35 |
| $70 \leq p \leq 100$ | 80 | 20 |

GAME DEVICE, METHOD OF CONTROLLING A GAME DEVICE, AND INFORMATION STORAGE MEDIUM

CROSS-REFERENCE TO RELATED APPLICATION

The present application claims priority from Japanese application JP 2010-080681 filed on Mar. 31, 2010, the content of which is hereby incorporated by reference into this application.

BACKGROUND OF THE INVENTION

1. Field of the Invention

The present invention relates to a game device, a method of controlling a game device, and an information storage medium.

2. Description of the Related Art

There is known a game of a competitive sport that is played by using a moving object. For example, as disclosed in JP 10-113471 A, there is known a game of a ball sport that is played by using a ball (moving object) (for example, soccer game, basketball game, or American football game) or a game of an ice hockey that is played by using a puck (moving object).

SUMMARY OF THE INVENTION

Incidentally, in an actual match of a competitive sport, whether or not a cooperative action (cooperative play) between players is performed smoothly depends on a relationship (for example, cooperativeness or congeniality) between the players. Therefore, if a user can also realize in such a game as described above that the cooperative action between game characters is sometimes performed smoothly and sometimes not performed smoothly, depending on the relationship (for example, cooperativeness or congeniality) between the game characters, it is possible to further improve the user's level of satisfaction.

The present invention has been made in view of the above-mentioned problem, and an object thereof is to provide a game device, a method of controlling a game device, and an information storage medium, which enable a user to realize that a cooperative action between game characters is performed sometimes smoothly and sometimes not smoothly depending on a relationship (for example, cooperativeness or congeniality) between the game characters.

In order to solve the above-mentioned problem, a game device according to the present invention is a game device for executing a game configured such that a plurality of game characters perform a competitive sport using a moving object, including: first selecting means for selecting any one of a plurality of movement control information items stored in movement control information storage for storing the plurality of movement control information items for controlling at least one of a movement target position and a moving direction of a game character; relationship information acquiring means for acquiring relationship information associated with a combination of a first game character and a second game character in possession of the moving object from relationship information storage for storing the relationship information on a relationship between game characters in association with the combination of the game characters; second selecting means for selecting any one of the plurality of movement control information items based on a selection result obtained by the first selecting means and the relationship information acquired by the relationship information acquiring means; first game character control means for causing the first game character to move based on the one of the plurality of movement control information items that has been selected by one of the first selecting means and the second selecting means; and second game character control means for causing, in a case where the first game character is caused to move based on the one of the plurality of movement control information items that has been selected by the one of the first selecting means and the second selecting means, the second game character to perform an action for moving the moving object toward a target position determined based on the one of the plurality of movement control information items that has been selected by another one of the first selecting means and the second selecting means.

Further, a method of controlling a game device according to the present invention is a method of controlling a game device for executing a game configured such that a plurality of game characters perform a competitive sport using a moving object, including: a first selecting step of selecting any one of a plurality of movement control information items stored in movement control information storage for storing the plurality of movement control information items for controlling at least one of a movement target position and a moving direction of a game character; a relationship information acquiring step of acquiring relationship information associated with a combination of a first game character and a second game character in possession of the moving object from relationship information storage for storing the relationship information on a relationship between game characters in association with the combination of the game characters; a second selecting step of selecting any one of the plurality of movement control information items based on a selection result obtained in the first selecting step and the relationship information acquired in the relationship information acquiring step; a first game character control step of causing the first game character to move based on the one of the plurality of movement control information items that has been selected in one of the first selecting step and the second selecting step; and a second game character control step of causing, in a case where the first game character is caused to move based on the one of the plurality of movement control information items that has been selected in the one of the first selecting step and the second selecting step, the second game character to perform an action for moving the moving object toward a target position determined based on the one of the plurality of movement control information items that has been selected in another one of the first selecting step and the second selecting step.

Further, a program according to the present invention is a program causing a computer to function as a game device for executing a game configured such that a plurality of game characters perform a competitive sport using a moving object, the program further causing the computer to function as: first selecting means for selecting any one of a plurality of movement control information items stored in movement control information storage for storing the plurality of movement control information items for controlling at least one of a movement target position and a moving direction of a game character; relationship information acquiring means for acquiring relationship information associated with a combination of a first game character and a second game character in possession of the moving object from relationship information storage for storing the relationship information on a relationship between game characters in association with the combination of the game characters; second selecting means for selecting any one of the plurality of movement control information items based on a selection result obtained by the first selecting means and the relationship information acquired by the relationship information acquiring means; first game character control means for causing the first game character to move based on the one of the plurality of movement control information items that has been selected by one of the first selecting means and the second selecting means;

and second game character control means for causing, in a case where the first game character is caused to move based on the one of the plurality of movement control information items that has been selected by the one of the first selecting means and the second selecting means, the second game character to perform an action for moving the moving object toward a target position determined based on the one of the plurality of movement control information items that has been selected by another one of the first selecting means and the second selecting means.

Further, an information storage medium according to the present invention is a computer-readable information storage medium storing the above-mentioned program.

According to the present invention, it is possible to cause the user to realize that the cooperative action between game characters is performed sometimes smoothly and sometimes not smoothly depending on the relationship (for example, cooperativeness or congeniality) between the game characters.

Further, according to one aspect of the present invention, the second selecting means may include: means for judging whether or not the relationship information associated with the combination of the first game character and the second game character satisfies a predetermined condition; means for selecting, if the predetermined condition is judged to be satisfied, the same one of the plurality of movement control information items as the one of the plurality of movement control information items that has been selected by the first selecting means, from among the plurality of movement control information items; and means for selecting, if the predetermined condition is not judged to be satisfied, any one of the plurality of movement control information items different from the one of the plurality of movement control information items that has been selected by the first selecting means, from among the plurality of movement control information items.

Further, according to one aspect of the present invention, the second selecting means may include: means for selecting any one of the plurality of movement control information items based on probability information; and means for setting the probability information based on the relationship information associated with the combination of the first game character and the second game character, by setting a probability that the same one of the plurality of movement control information items as the one of the plurality of movement control information items selected by the first selecting means is selected, based on the relationship information associated with the combination of the first game character and the second game character.

Further, according to one aspect of the present invention, the game device may further include: comparing means for comparing the selection result obtained by the first selecting means and a selection result obtained by the second selecting means; and game processing execution means for executing game processing based on a comparison result obtained by the comparing means.

BRIEF DESCRIPTION OF THE DRAWINGS

In the accompanying drawings:

FIG. 6 is a diagram illustrating an example of a player's state table;

FIG. 7 is a diagram illustrating an example of a cooperativeness parameter table;

FIG. 8 is a diagram illustrating an example of a movement pattern table;

FIG. 9 is a diagram illustrating an example of a probability setting table;

DETAILED DESCRIPTION OF THE INVENTION

Hereinafter, detailed description is given of an example of an embodiment of the present invention with reference to the drawings. A game device according to the embodiment of the present invention is implemented by, for example, a home-use game machine (stationary game machine), a portable game machine, a cellular phone, a personal digital assistant (PDA), or a personal computer. Herein, description is given of a case in which the game device according to the embodiment of the present invention is implemented by a home-use game machine.

Figure 1:
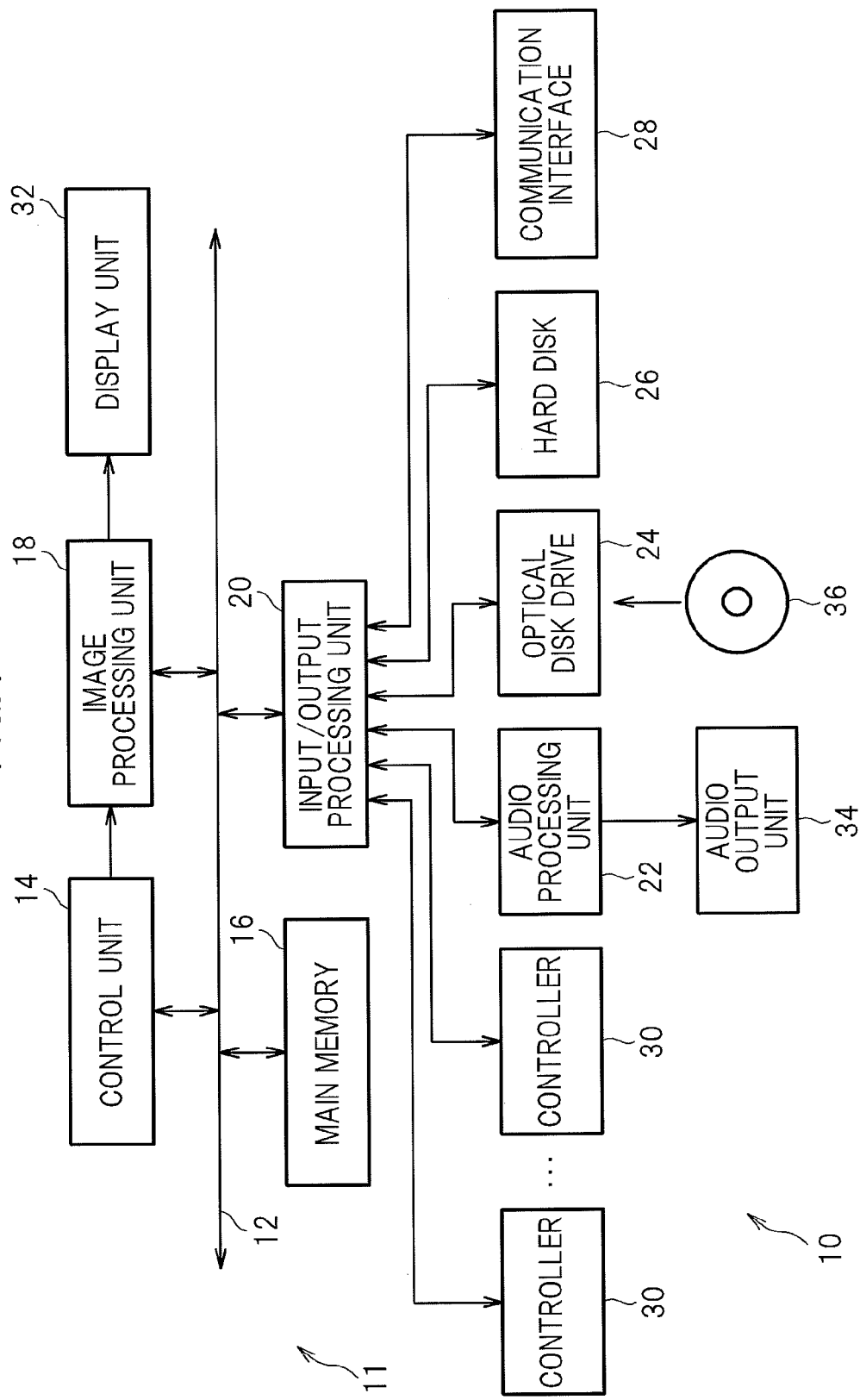
FIG. 1 is a diagram illustrating a hardware configuration of a game device according to an embodiment of the present invention.

FIG. 1 illustrates a hardware configuration of the game device according to the embodiment of the present invention. A game device 10 illustrated in FIG. 1 includes a home-use game machine 11, a display unit 32, an audio output unit 34, and an optical disk (information storage medium) 36. The display unit 32 and the audio output unit 34 are connected to the home-use game machine 11. For example, a home-use television set or a liquid crystal display is used as the display unit 32. For example, a speaker built into the home-use television set or headphones are used as the audio output unit 34.

The home-use game machine 11 is a well-known computer game system. The home-use game machine 11 includes a bus 12, a control unit 14, a main memory 16, an image processing unit 18, an input/output processing unit 20, an audio processing unit 22, an optical disk drive 24, a hard disk 26, a communication interface 28, and a controller 30.

The control unit 14 includes one or a plurality of microprocessors. The control unit 14 executes processing for controlling the components of the home-use game machine 11 and information processing based on an operating system stored in a ROM (not shown) or a program read from the optical disk 36. The main memory 16 includes, for example, a RAM. The program and data read from the optical disk 36 are written into the main memory 16. The main memory 16 is also used as a working memory for the control unit 14. The bus 12 is used for exchanging addresses and data among the components of the home-use game machine 11.

The image processing unit 18 includes a VRAM, and renders a game screen in the VRAM, based on image data supplied from the control unit 14. Then, the image processing unit 18 converts the game screen rendered in the VRAM into video signals, and outputs the video signals to the display unit 32 at a predetermined time.

The input/output processing unit 20 is an interface for the control unit 14 to access the audio processing unit 22, the optical disk drive 24, the hard disk 26, the communication interface 28, and the controller 30. The audio processing unit 22 includes a sound buffer, and outputs, from the audio output unit 34, audio data that has been loaded from the optical disk 36 into the sound buffer. The communication interface 28 is an interface for connecting the home-use game machine 11 to a communication network such as the Internet in either a wired or wireless manner.

The optical disk drive 24 reads a program or data recorded on the optical disk 36. Herein, the optical disk 36 is used for supplying the program or the data to the home-use game machine 11. Alternatively, another information storage medium, such as a memory card, may be used. Alternatively, the program or the data may be supplied to the home-use game machine 11 from a remote place via the communication network, for example. The hard disk 26 is a commonly-used hard disk device (auxiliary storage device). Note that the program or the data, which is supposed to be stored in the optical disk 36, may be stored in the hard disk 26.

The controller 30 is an operation unit for a user to perform game operations. One or a plurality of the controllers 30 are connected to the home-use game machine 11 in either a wired or wireless manner. The input/output processing unit 20 scans a state of each of operation members of the controller 30 at fixed intervals (for example, every $1/60^{th}$ of a second), and then supplies an operation signal indicating a result of the scanning to the control unit 14 via the bus 12. The control unit 14 makes judgment on the game operation by the user based on the operation signal.

On the game device 10, a game configured such that, for example, a plurality of game characters play a competitive sport that is played by using a moving object is executed by executing a game program read from the optical disk 36. Hereinafter, a case where a soccer game is executed is described. In the soccer game, a match is performed between a team operated by the user (hereinafter, referred to as "user team") and a team operated by an opponent (computer or another user) (hereinafter, referred to as "opponent team").

Figure 2:
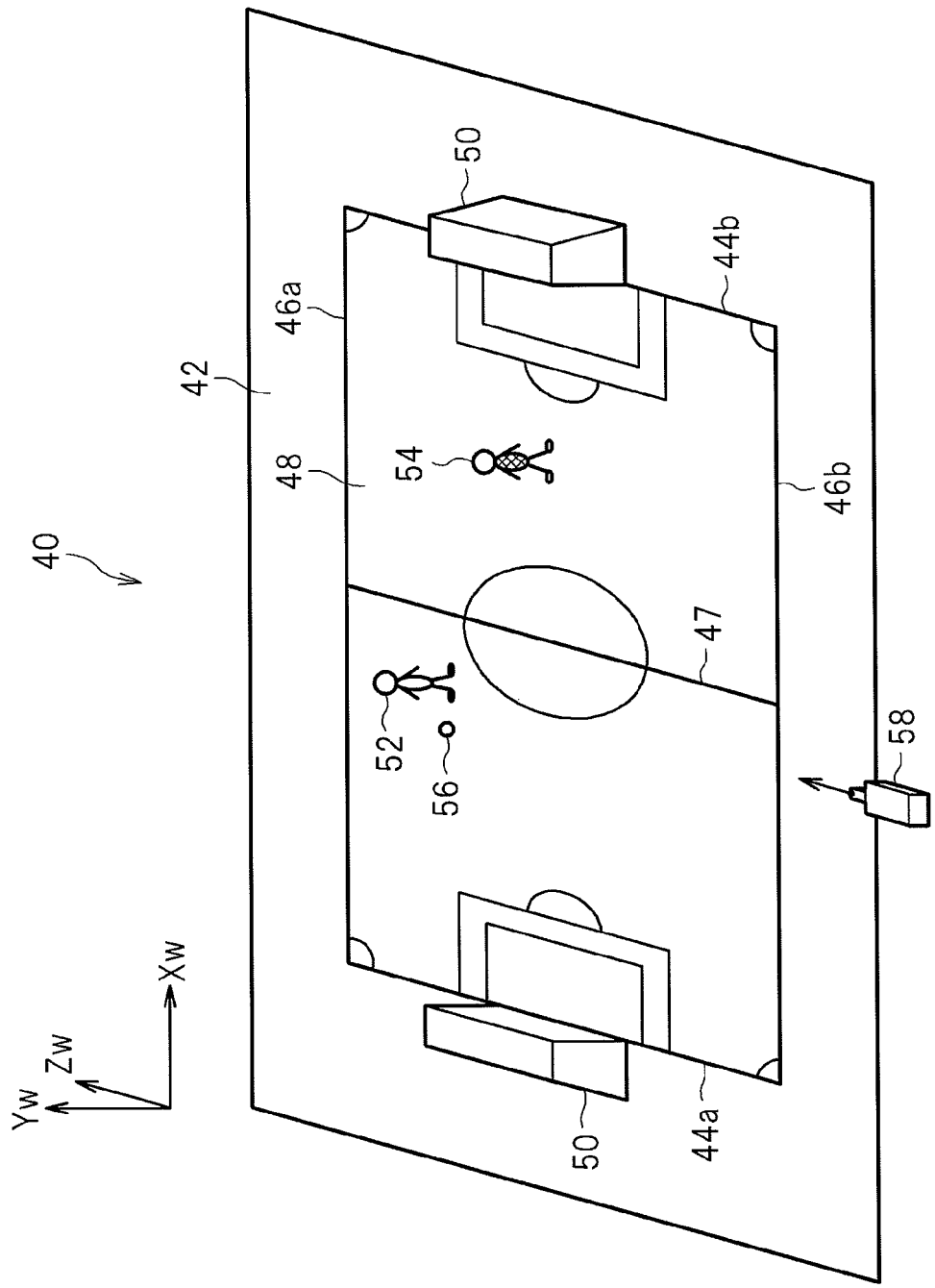
FIG. 2 is a diagram illustrating an example of a game space.

When the soccer game is executed, a game space is built in the main memory 16. FIG. 2 illustrates an example of the game space. A game space 40 illustrated in FIG. 2 is a virtual three-dimensional space in which three axes of coordinates (Xw axis, Yw axis, and Zw axis) orthogonal to each other are set. As illustrated in FIG. 2, a field 42, which is an object representing a soccer field, is disposed in the game space 40. Two goal lines 44a and 44b, two touchlines 46a and 46b, and a center line 47 are displayed on the field object 42. A match is performed within a pitch 48 surrounded by the two goal lines 44a and 44b and the two touchlines 46a and 46b.

Further, goals 50 that are objects representing goals for soccer, player characters 52 and 54 that are objects representing soccer players, and a ball 56 that is an object representing a soccer ball are disposed on the field object 42. Note that the player character 52 is a player character belonging to the user team, and the player character 54 is a player character belonging to the opponent team. In actuality, eleven player characters 52 belonging to the user team and eleven player characters 54 belonging to the opponent team are disposed on the field object 42, which are omitted in FIG. 2.

One of the goals 50 is associated with the user team, whereas the other one of the goals 50 is associated with the opponent team. If the ball 56 moves into the goal 50 associated with any one of the teams, a scoring event occurs for the other one of the teams.

When the player character 52 (54) and the ball 56 come close to each other, the player character 52 (54) and the ball 56 become associated with each other under a predetermined condition. In this case, the moving action of the player character 52 (54) becomes a dribbling action. The state in which the ball 56 is associated with the player character 52 (54) is hereinafter referred to as a state in which "the player character 52 (54) is in possession of the ball 56".

Further, a virtual camera 58 (viewpoint) is set in the game space 40. A game screen showing the game space 40, which is viewed from the virtual camera 58, is displayed on the display unit 32. For example, in order to constantly display the ball 56 on the game screen, the virtual camera 58 moves based on the position of the ball 56.

Figure 3:
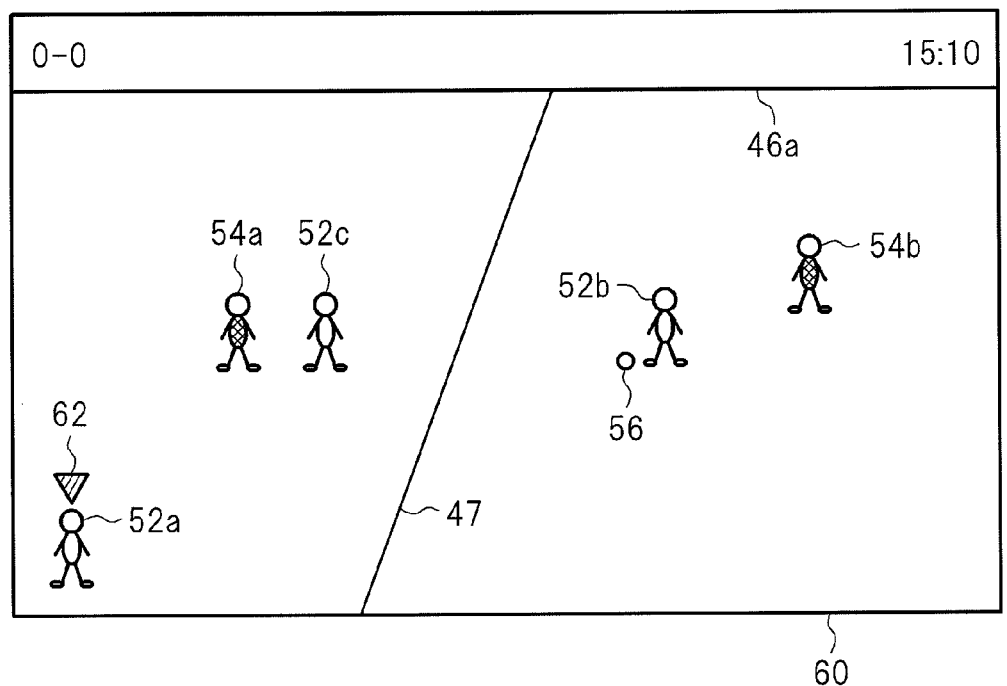
FIG. 3 is a diagram illustrating an example of a game screen.

FIG. 3 illustrates an example of the game screen. Three player characters 52a, 52b, and 52c belonging to the user team, and two player characters 54a and 54b belonging to the opponent team are displayed on a game screen 60 illustrated in FIG. 3.

In this soccer game, any one of the player characters 52 belonging to the user team is set as a user's operation target. A cursor 62 serves to indicate the player character 52 set as the user's operation target. On the game screen 60 illustrated in FIG. 3, the cursor 62 in an inverted triangle shape is displayed above the head of the player character 52a. Therefore, the player character 52a is set as the user's operation target in a situation illustrated in FIG. 3.

The player character 52 set as the user's operation target behaves based on the operation of the user. On the other hand, the player characters 52 that are not set as the user's operation target among the player characters 52 belonging to the user team behave according to the control of the computer (control unit 14).

Figure 4:
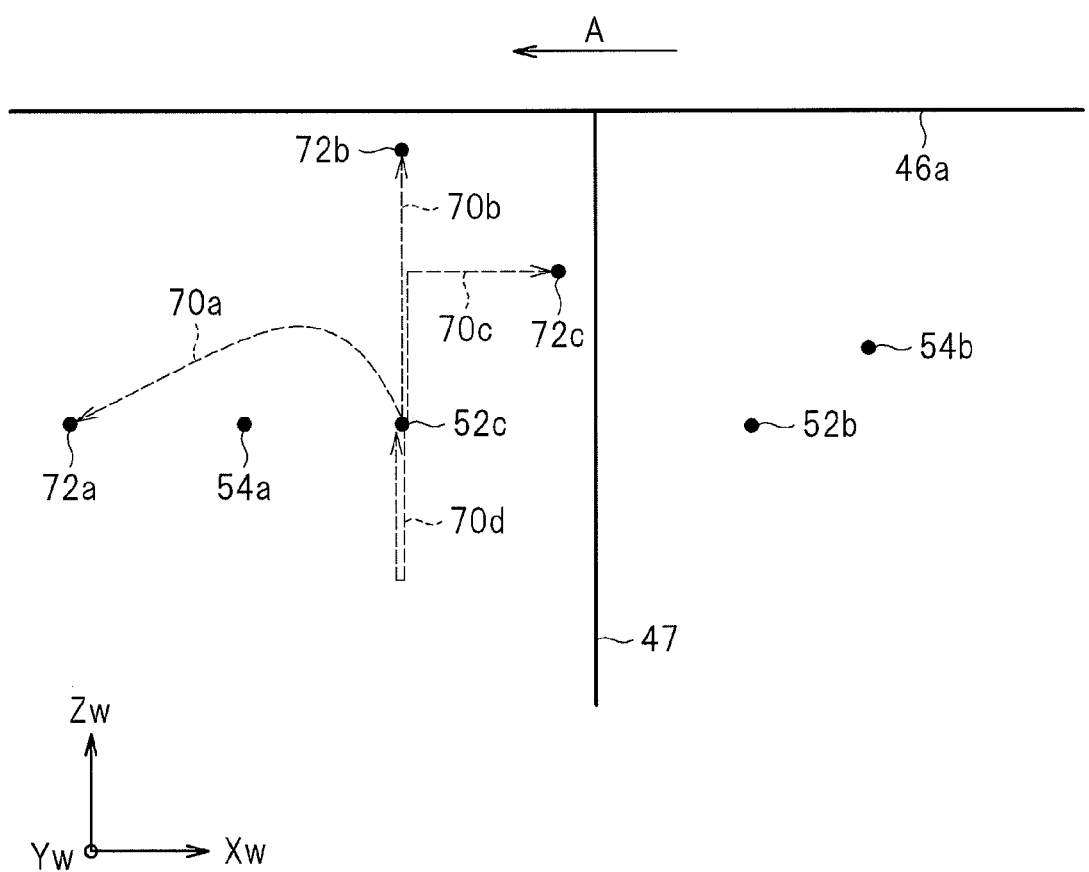
FIG. 4 is an explanatory diagram illustrating an example of control contents of player characters.

For example, in the situation illustrated in FIG. 3, the player characters 52b and 52c are controlled as described below. FIG. 4 is an explanatory diagram illustrating an example of control contents of the player characters 52b and 52c in the situation illustrated in FIG. 3. Note that the user team (player characters 52b and 52c) is assumed to be making an attack toward an A direction.

In the case of the situation illustrated in FIG. 3, the player character 52c is controlled to move based on any one of movement patterns selected from, for example, four kinds of movement patterns described below by the control unit 14. Note that the movement patterns are not limited to the movement patterns described below, and various movement patterns may be used.

FIG. 4 illustrates a movement pattern 70a as a first movement pattern. In the movement pattern 70a, the player character 52c is diverted around the player character 54a belonging to the opponent team to head toward a movement target position 72a set behind the player character 54a.

FIG. 4 illustrates a movement pattern 70b as a second movement pattern. In the movement pattern 70b, the player character 52c moves toward the touchline 46a in a positive Zw-axis direction. In this case, the player character 52c moves toward a movement target position 72b set in the vicinity of the touchline 46a.

FIG. 4 illustrates a movement pattern 70c as a third movement pattern. In the movement pattern 70c, the player character 52c moves toward the touchline 46a in the positive Zw-axis direction and then changes the movement to a direction (positive Xw-axis direction) reverse to the attacking direction (A direction). In this case, the player character 52c moves toward a movement target position 72c.

FIG. 4 illustrates a movement pattern 70d as a fourth movement pattern. In the movement pattern 70d, the player character 52c moves away from the touchline 46a in a negative Zw-axis direction and then changes the moving direction by 180° to return to the original position in the positive Zw-axis direction.

Meanwhile, the player character 52b in possession of the ball 56 is controlled to perform a pass to, for example, the player character 52c.

Note that the player characters 54 belonging to the opponent team also behave based on the control of the computer (control unit 14). For example, in the case of the situation illustrated in FIG. 3, the player characters 54a and 54b are controlled to defend against the player characters 52b and 52c.

Described below is technology for allowing the user to realize on the above-mentioned game device 10 that a cooperative action (cooperative play) between the player characters 52 is performed sometimes smoothly and sometimes not smoothly depending on a relationship (for example, cooperativeness or congeniality) between the player characters 52.

Figure 5:
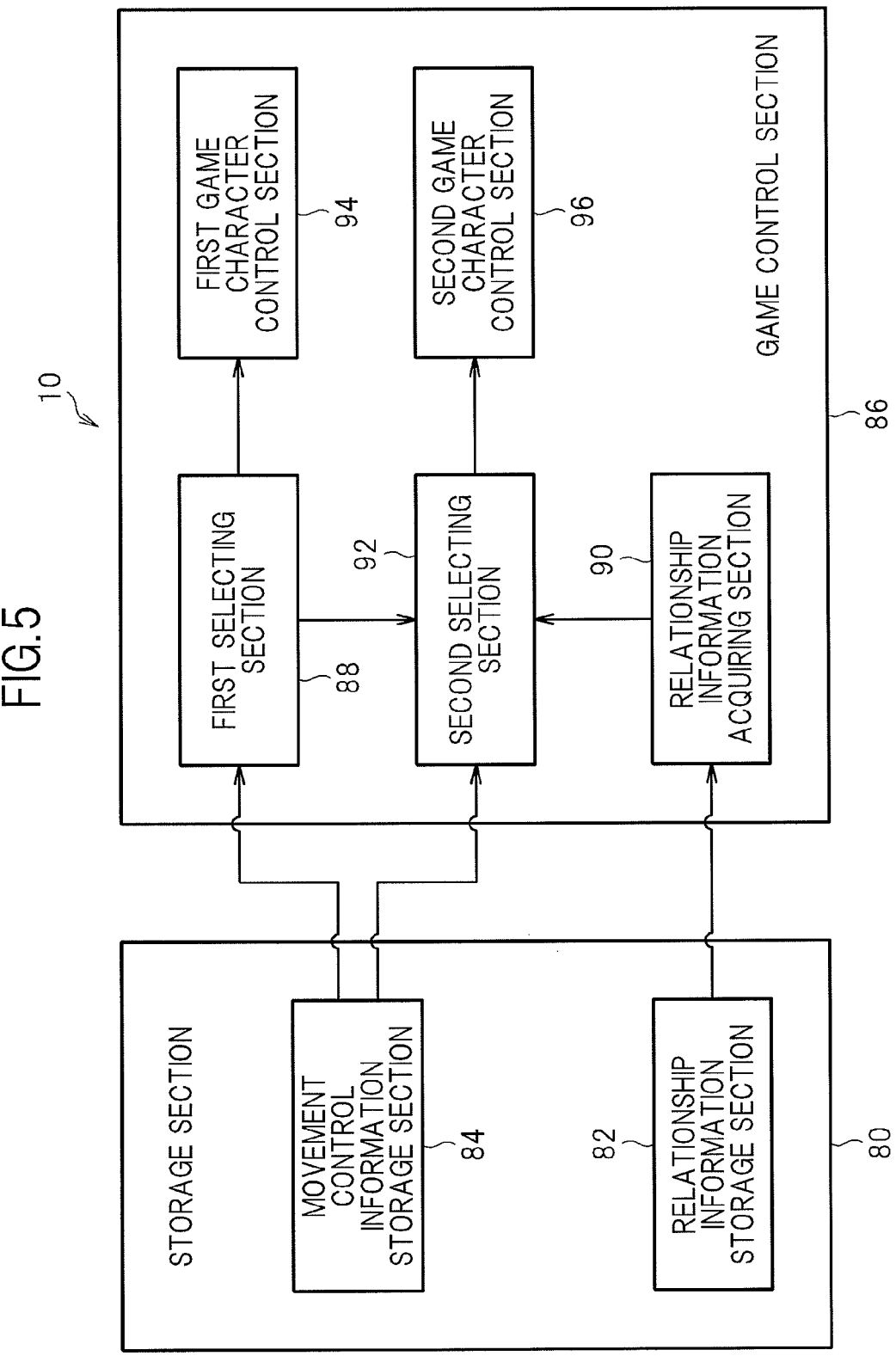
FIG. 5 is a functional block diagram of the game device according to the embodiment of the present invention.

FIG. 5 is a functional block diagram illustrating functions implemented on the game device 10. As illustrated in FIG. 5, the game device 10 includes a storage section 80 and a game control section 86. The storage section 80 is implemented by at least one of, for example, the main memory 16, the hard disk 26, and the optical disk 36. Note that the storage section 80 may be implemented by a storage device (for example, hard disk drive) provided to another device connected to the game device 10 via the communication network. The game control section 86 is implemented by the control unit 14 executing the programs stored in the optical disk 36.

The storage section 80 stores data necessary for executing the game. For example, the storage section 80 stores model data indicating a shape of each object disposed in the game space 40. Further, the storage section 80 stores motion data indicating a change in posture exhibited by the player characters 52 and 54 performing each kind of action. In addition, the storage section 80 stores an ability parameter indicating ability of each of the player characters 52 and 54.

Further, for example, the storage section 80 stores game situation data indicating the current game situation. For example, the game situation data includes the following data:
(a) data indicating the state of each of the player characters 52 and 54;
(b) data indicating the state of the ball 56 (for example, position, moving direction, and moving speed);
(c) data indicating the state of the virtual camera 58 (for example, position, direction of sight, and angle of view);
(d) data indicating the scores of both the teams; and
(e) data indicating an elapsed time period.

FIG. 6 illustrates an example of a player's state table indicating the state of the player characters 52 and 54. Each record of the player's state table illustrated in FIG. 6 includes a "player ID" field, a "position" field, a "posture" field, an "operation target flag" field, a "ball-keeping flag" field, and the like.

The "player ID" field indicates information for uniquely identifying the player characters 52 and 54. In FIG. 6, "P101" to "P111" are player IDs for the player characters 52 belonging to the user team, whereas "P201" to "P211" are player IDs for the player characters 54 belonging to the opponent team. The "position" field indicates the current positions of the player characters 52 and 54, whereas the "posture" field indicates the current postures of the player characters 52 and 54.

The "operation target flag" field indicates whether or not the player character 52 is set as the user's operation target, and takes a value of "0" or "1". The value "0" indicates that the player character 52 is not currently the user's operation target. On the other hand, the value "1" indicates that the player character 52 is currently the user's operation target. The "ball-keeping flag" field indicates whether or not the player character 52 or 54 is in possession of the ball 56, and takes a value of "0" or "1". The value "0" indicates that the player character 52 or 54 is not currently in possession of the ball 56, whereas the value "1" indicates that the player character 52 or 54 is currently in possession of the ball 56.

Note that although omitted from FIG. 6, the player's state table also stores, for example, orientations, the kind of action, the moving direction, and moving speed of the player characters 52 and 54.

The storage section 80 includes a relationship information storage section 82. The relationship information storage section 82 stores relationship information on the relationship (for example, cooperativeness or congeniality) between the player characters 52 (game characters) in association with the combination of the player characters 52.

FIG. 7 illustrates an example of a cooperativeness parameter table stored in the relationship information storage section 82. Each record of the cooperativeness parameter table illustrated in FIG. 7 includes a "player character combination" field and a "cooperativeness parameter" field. The "player character combination" field indicates a combination of player IDs of two player characters 52 belonging to the user team. A cooperativeness parameter (relationship information) is stored in the "cooperativeness parameter" field. The cooperativeness parameter indicates the level of cooperativeness between the two player characters 52. For example, the cooperativeness parameter assumes a numerical value of 0 to 100, and a higher value of cooperativeness parameter indicates a high cooperativeness between the two player characters 52.

Further, the storage section 80 includes a movement control information storage section 84. The movement control information storage section 84 stores a plurality of movement control information items for controlling at least one of the movement target position and the moving direction of the player character 52 (game character).

FIG. 8 illustrates an example of a movement pattern table stored in the movement control information storage section 84. Each record of the movement pattern table illustrated in FIG. 8 includes a "situation condition" field and a "movement pattern information" field. A condition regarding the situation of the player character 52 is stored in the "situation condition" field. In other words, a condition for judging whether or not the player character 52 is in a specific situation is stored in the "situation condition" field.

For example, the following conditions are stored in the "situation condition" field. By judging whether or not each of the following conditions is satisfied, it is judged whether or not, for example, the player character 52 is in the specific situation. Note that the condition is not limited to the following conditions, and various conditions may be used.
(a) whether or not the player character 52 belonging to the user team is in possession of the ball 56
(b) whether or not the player character 52 is located in a predetermined region within the pitch 48
(c) whether or not a positional relationship with the player character 52 in possession of the ball 56 is a predetermined positional relationship
(d) whether or not a positional relationship with the player character 54 belonging to the opponent team is a predetermined positional relationship Movement pattern information (movement control information) on the movement pattern is stored in the "movement pattern information" field. The movement pattern information is information indicating how to move the player character 52.

In the movement pattern table illustrated in FIG. 8, a plurality of movement pattern information items are associated with one situation condition. For example, four movement pattern information items, that is, a "movement pattern information item 1-1", a "movement pattern information item 1-2", a "movement pattern information item 1-3", and a "movement pattern information item 1-4", are associated with a "situation condition 1".

If the situation of the player character 52 satisfies the "situation condition 1", the player character 52 is controlled to move according to anyone of the "movement pattern information item 1-1", the "movement pattern information item 1-2", the "movement pattern information item 1-3", and the "movement pattern information item 1-4". That is, the movement target position, the moving direction, or the like of the player character 52 is controlled according to any one of the "movement pattern information item 1-1", the "movement pattern information item 1-2", the "movement pattern information item 1-3", and the "movement pattern information item 1-4".

Note that the following description is given assuming that the "situation condition 1" corresponds to a condition for judging whether or not the player character 52 is in the same situation as the situation of the player character 52c of FIG. 3. Further, the description is given assuming that the "movement pattern information item 1-1" corresponds to information for causing the player character 52 to move according to the movement pattern 70a illustrated in FIG. 4 and that the "movement pattern information item 1-2" corresponds to information for causing the player character 52 to move according to the movement pattern 70b illustrated in FIG. 4. In the same manner, the description is given assuming that the "movement pattern information item 1-3" corresponds to information for causing the player character 52 to move according to the movement pattern 70c illustrated in FIG. 4 and that the "movement pattern information item 1-4" corresponds to information for causing the player character 52 to move according to the movement pattern 70d illustrated in FIG. 4.

The game control section 86 executes control related to the game. The game control section 86 includes a first selecting section 88, a relationship information acquiring section 90, a second selecting section 92, a first game character control section 94, and a second game character control section 96. Note that operations of those functional blocks are described below by taking as an example a case of controlling the player character 52b and the player character 52c illustrated in FIG. 3.

The first selecting section 88 selects anyone of the plurality of movement control information items stored in the movement control information storage section 84. In the case of this embodiment, the first selecting section 88 judges whether or not the situation of the player character 52c (first game character) satisfies any one of the situation conditions stored in the movement pattern table. Then, if the situation of the player character 52c satisfies any one of the situation conditions stored in the movement pattern table, the first selecting section 88 selects any one of a plurality of movement pattern information items associated with the situation condition. For example, if the situation of the player character 52c satisfies the "situation condition 1", the first selecting section 88 selects any one of the "movement pattern information item 1-1" to the "movement pattern information item 1-4" associated with the "situation condition 1".

The relationship information acquiring section 90 acquires the relationship information associated with a combination of the player character 52c and the player character 52b (second game character) in possession of the moving object. In the case of this embodiment, the relationship information acquiring section 90 acquires the cooperativeness parameter associated with the combination of the player character 52b and the player character 52c.

The second selecting section 92 selects any one of the plurality of movement control information items stored in the movement control information storage section 84 based on a selection result obtained by the first selecting section 88 and the relationship information acquired by the relationship information acquiring section 90.

For example, if any one of the "movement pattern information item 1-1" to the "movement pattern information item 1-4" associated with the "situation condition 1" is selected by the first selecting section 88, the "movement pattern information item 1-1" to the "movement pattern information item 1-4" correspond to the "plurality of movement control information items". In this case, the second selecting section 92 selects any one of the "movement pattern information item 1-1" to the "movement pattern information item 1-4" based on the selection result obtained by the first selecting section 88 and the cooperativeness parameter associated with the combination of the player character 52b and the player character 52c. Described below is an example of the operation of the second selecting section 92 in the case of selecting any one of the "movement pattern information item 1-1" to the "movement pattern information item 1-4".

First, the second selecting section 92 judges whether or not the cooperativeness parameter associated with the combination of the player character 52b and the player character 52c satisfies a predetermined condition. Here, the "predetermined condition" is a condition of, for example, whether or not the cooperativeness parameter has a value larger than a reference value.

If the cooperativeness parameter associated with the combination of the player character 52b and the player character 52c satisfies the predetermined condition, the second selecting section 92 selects the same movement pattern information as the movement pattern information selected by the first selecting section 88 from among the "movement pattern information item 1-1" to the "movement pattern information item 1-4". For example, if the "movement pattern information item 1-1" has been selected by the first selecting section 88, the second selecting section 92 also selects the "movement pattern information item 1-1".

On the other hand, if the cooperativeness parameter associated with the combination of the player character 52b and the player character 52c does not satisfy the predetermined condition, the second selecting section 92 selects anyone of the movement pattern information items different from the movement pattern information selected by the first selecting section 88 from among the "movement pattern information item 1-1" to the "movement pattern information item 1-4". For example, if the "movement pattern information item 1-1" is selected by the first selecting section 88, the second selecting section 92 selects any one of the "movement pattern information item 1-2" to the "movement pattern information item 1-4" other than the "movement pattern information item 1-1".

Note that the operation of the second selecting section 92 is not limited to the above-mentioned operation. Described below is another example of the operation of the second selecting section 92 in the case of selecting any one of the "movement pattern information item 1-1" to the "movement pattern information item 1-4".

In this case, the second selecting section 92 selects anyone of the "movement pattern information item 1-1" to the "movement pattern information item 1-4" based on probability information. The second selecting section 92 sets the probability information based on the selection result obtained by the first selecting section 88 and the relationship information acquired by the relationship information acquiring section 90. In the case of this embodiment, the second selecting section 92 sets the probability that the same movement pattern information as the movement pattern information selected by the first selecting section 88 is selected, based on the cooperativeness parameter associated with the combination of the player character 52b and the player character 52c.

Information for performing the above-mentioned setting is stored in the storage section 80. That is, information for setting the probability that the same movement pattern information as the movement pattern information selected by the first selecting section 88 is selected, based on the cooperativeness parameter associated with the combination of the player character 52b and the player character 52c, is stored in the storage section 80.

FIG. 9 is a diagram illustrating an example of a probability setting table stored in the storage section 80. As illustrated in FIG. 9, the probability setting table represents information obtained by associating the cooperativeness parameter with the probability information. Each record of the probability setting table illustrated in FIG. 9 includes a "cooperativeness parameter" field and a "probability information" field.

The "cooperativeness parameter" field indicates a condition regarding the cooperativeness parameter. The "probability information" field includes a "probability P1" field and a "probability P2" field. The "probability P1" field indicates the probability that the same movement pattern information as the movement pattern information selected by the first selecting section 88 is selected. The "probability P2" field indicates the probability that the movement pattern information different from the movement pattern information selected by the first selecting section 88 is selected. Note that one of the "probability P1" field and the "probability P2" field may be omitted because one value of the "probability P1" field and the "probability P2" field can be identified from the other value.

In the probability setting table illustrated in FIG. 9, a probability P1 used in a case where the value of the cooperativeness parameter is relatively high is set higher than in a case where the value of the cooperativeness parameter is relatively low. Therefore, in the case where the value of the cooperativeness parameter is relatively high, the same movement pattern information as the movement pattern information selected by the first selecting section 88 is more likely to be selected by the second selecting section 92 than in the case where the value of the cooperativeness parameter is relatively low.

Further, a probability P2 used in the case where the value of the cooperativeness parameter is relatively low is set higher than in the case where the value of the cooperativeness parameter is relatively high. Therefore, in the case where the value of the cooperativeness parameter is relatively low, the movement pattern information different from the movement pattern information selected by the first selecting section 88 is more likely to be selected by the second selecting section 92 than in the case where the value of the cooperativeness parameter is relatively high. In other words, the same movement pattern information as the movement pattern information selected by the first selecting section 88 is less likely to be selected by the second selecting section 92.

The second selecting section 92 sets the probability P1 that the same movement pattern information as the movement pattern information selected by the first selecting section 88 is selected, based on the cooperativeness parameter associated with the combination of the player character 52b and the player character 52c and the probability setting table illustrated in FIG. 9.

Then, the second selecting section 92 determines, based on the above-mentioned probability P1, whether or not the same movement pattern information as the movement pattern information selected by the first selecting section 88 is to be selected. If it is determined that the same movement pattern information as the movement pattern information selected by the first selecting section 88 is to be selected, the second selecting section 92 selects the same movement pattern information as the movement pattern information selected by the first selecting section 88. For example, if the "movement pattern information item 1-1" has been selected by the first selecting section 88, the second selecting section 92 also selects the "movement pattern information item 1-1".

On the other hand, if it is determined that the same movement pattern information as the movement pattern information selected by the first selecting section 88 is not to be selected, the second selecting section 92 selects any one of the movement pattern information items different from the movement pattern information selected by the first selecting section 88. For example, if the "movement pattern information item 1-1" has been selected by the first selecting section 88, the second selecting section 92 selects any one of the "movement pattern information item 1-2" to the "movement pattern information item 1-4" other than the "movement pattern information item 1-1".

The first game character control section 94 causes the player character 52c to move based on the movement control information selected by one of the first selecting section 88 and the second selecting section 92. In the case of this embodiment, the first game character control section 94 causes the player character 52c to move based on the movement control information selected by the first selecting section 88. For example, if the "movement pattern information item 1-1" is selected by the first selecting section 88, the first game character control section 94 causes the player character 52c to move according to the movement pattern 70a as illustrated in FIG. 4.

In a case where the player character 52c is caused to move based on the movement control information selected by one of the first selecting section 88 and the second selecting section 92 (in other words, in a case where the movement of the player character 52c is controlled by the first game character control section 94), the second game character control section 96 causes the player character 52b in possession of the ball 56 to perform an action for moving the ball 56 toward a target position determined based on the movement control information selected by the other one of the first selecting section 88 and the second selecting section 92. Note that, the "action for moving the ball 56 toward a target position" is, for example, a pass action.

In the case of this embodiment, the second game character control section 96 causes the player character 52b to perform the action for moving the ball 56 toward the target position determined based on the movement control information selected by the second selecting section 92. For example, the "movement pattern information item 1-1" is selected by the second selecting section 92, the second game character control section 96 sets the movement target position 72a illustrated in FIG. 4 as a pass target position. Then, the second game character control section 96 causes the player character 52b to perform a pass to the movement target position 72a.

Figure 10:
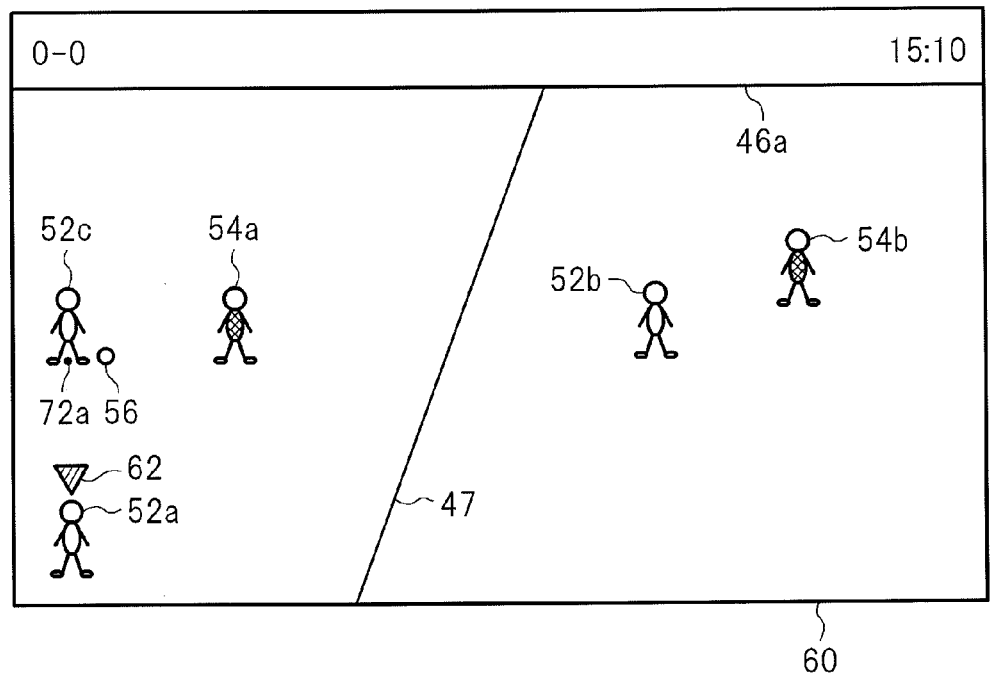
FIG. 10 is a diagram illustrating an example of a game situation.

For example, if the movement pattern information selected by the first selecting section 88 and the movement pattern information selected by the second selecting section 92 are both the "movement pattern information item 1-1", the player character 52c moves toward the movement target position 72a according to the movement pattern 70a. Meanwhile, the player character 52b in possession of the ball 56 performs a pass to the movement target position 72a. Note that in this case, the player character 54a belonging to the opponent team is located between the player character 52b and the movement target position 72a as illustrated in FIG. 4, the player character 52b performs a so-called lofted pass (that is, such a pass that the ball 56 flies over the player character 54a to reach the movement target position 72a) as the pass to the movement target position 72a. Then, in this case, as illustrated in FIG. 10, a pass is successfully performed to the player character 52c that has moved to the movement target position 72a. Thus, if the movement pattern information selected by the first selecting section 88 and the movement pattern information selected by the second selecting section 92 are the same as each other, a pass is successfully performed from the player character 52b to the player character 52c that has moved according to the movement pattern information.

Figure 11:
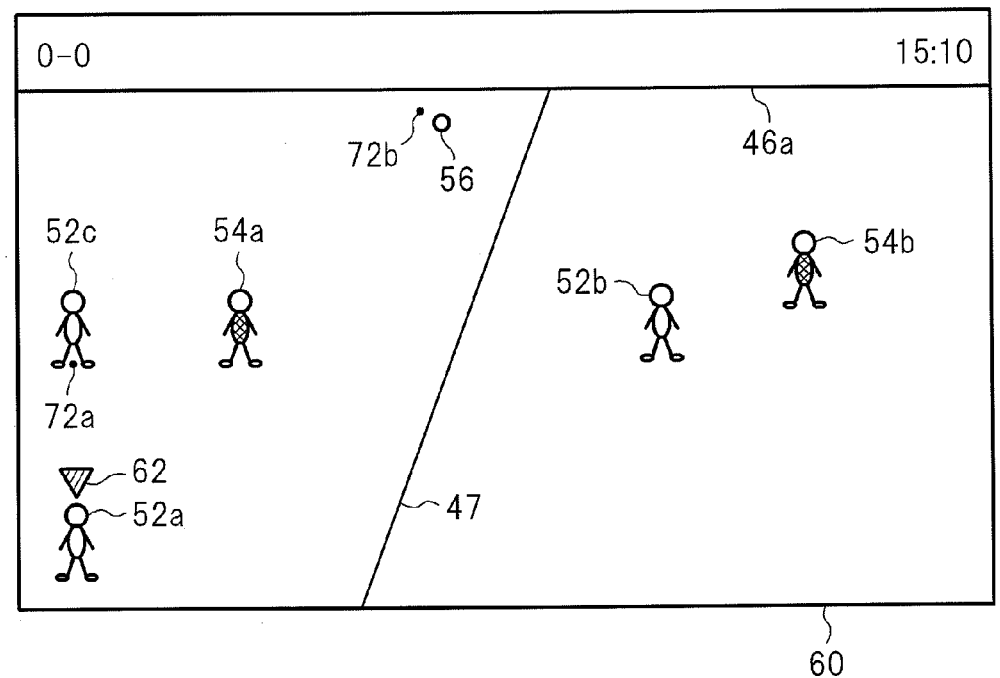
FIG. 11 is a diagram illustrating another example of the game situation.

On the other hand, for example, if the movement pattern information selected by the first selecting section 88 is the "movement pattern information item 1-1" and if the movement pattern information selected by the second selecting section 92 is the "movement pattern information item 1-2", the player character 52c moves toward the movement target position 72a according to the movement pattern 70a. Meanwhile, the player character 52b in possession of the ball 56 performs a pass to the movement target position 72b. In this case, as illustrated in FIG. 11, a pass fails to be performed to the player character 52c that has moved to the movement target position 72a. Thus, if the movement pattern information selected by the first selecting section 88 and the movement pattern information selected by the second selecting section 92 are different from each other, a pass fails to be performed from the player character 52b to the player character 52c that has moved according to the movement pattern information.

As described above, it is determined based on the value of the cooperativeness parameter associated with the combination of the player character 52b and the player character 52c whether or not the movement pattern information selected by the first selecting section 88 and the movement pattern information selected by the second selecting section 92 are the same as each other. In the case where the value of the cooperativeness parameter is relatively high, the movement pattern information selected by the first selecting section 88 and the movement pattern information selected by the second selecting section 92 are more likely to be the same, while in the case where the value of the cooperativeness parameter is relatively low, the movement pattern information selected by the first selecting section 88 and the movement pattern information selected by the second selecting section 92 are less likely to be the same.

As a result, in the case where the value of the cooperativeness parameter is relatively high, the pass is more likely to be successfully performed from the player character 52b to the player character 52c that has moved according to the movement pattern information, while in the case where the value of the cooperativeness parameter is relatively low, the pass is more likely to fail to be performed from the player character 52b to the player character 52c that has moved according to the movement pattern information. According to the game device 10, it is possible to allow the user to realize that cooperative play (pass) between the player characters 52b and 52c is performed sometimes smoothly and sometimes not smoothly depending on the relationship (for example, cooperativeness or congeniality) between the player characters 52b and 52c.

Next described is processing performed by the game device 10. Here, processing executed in a case where the player character 52 belonging to the user team is in possession of the ball 56 is described. In particular, described here is processing performed by the game device 10 in a case where the player character 52 in possession of the ball 56 is caused to perform a pass to another player character 52 belonging to the user team.

Figure 12:
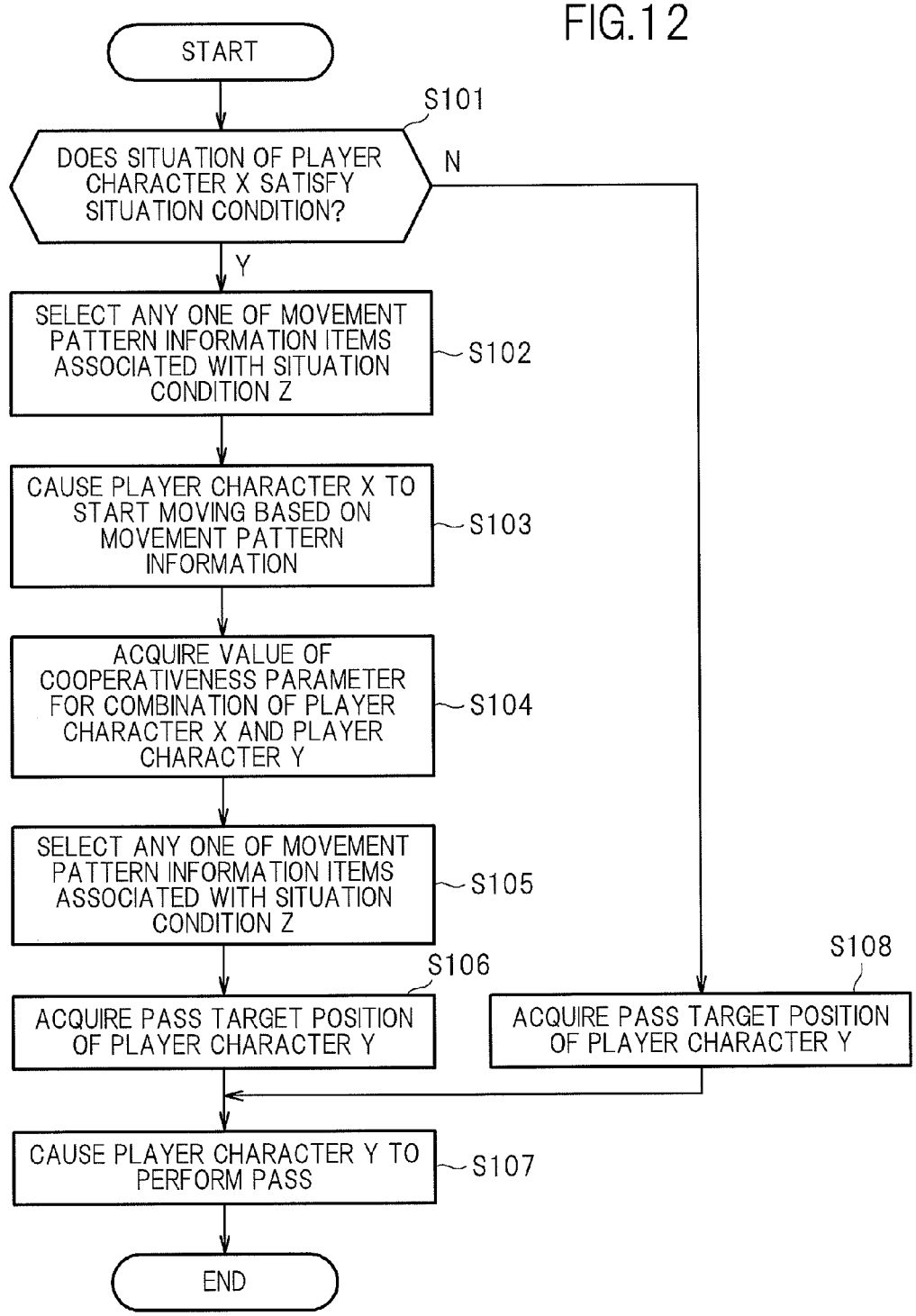
FIG. 12 is a flowchart illustrating an example of processing executed by the game device.

FIG. 12 is a flowchart illustrating an example of the processing executed by the game device 10 in that case. The control unit 14 executes the processing illustrated in FIG. 12 according to the program stored in the optical disk 36. The game control section 86 is implemented by the control unit 14 executing the processing illustrated in FIG. 12.

Note that hereinafter, for the convenience of the description, the player character 52 that receives a pass is referred to as a "player character X", and the player character 52 in possession of the ball 56, that is, the player character 52 that performs the pass, is referred to as a "player character Y". Note that the player character X corresponds to the player character 52c illustrated in FIG. 3, and the player character Y corresponds to the player character 52b illustrated in FIG. 3.

As illustrated in FIG. 12, first, the control unit 14 judges whether or not the situation of the player character X satisfies any one of the situation conditions stored in the movement pattern table (S101). If the situation of the player character X satisfies any one of the situation conditions stored in the movement pattern table, the control unit 14 (first selecting section 88) selects any one of the movement pattern information items associated with the situation condition (S102). Note that hereinafter, for the convenience of the description, the situation condition judged to be satisfied in Step S101 is referred to as a "situation condition Z".

For example, if it is judged in Step S101 that the situation of the player character X satisfies the "situation condition 1" illustrated in FIG. 8, that is, if the situation condition Z corresponds to the "situation condition 1", the control unit 14 selects any one of the "movement pattern information item 1-1" to the "movement pattern information item 1-4" associated with the "situation condition 1". For example, the control unit 14 randomly selects any one of the "movement pattern information item 1-1" to the "movement pattern information item 1-4" based on a random number. Note that the control unit 14 may select any one of the "movement pattern information item 1-1" to the "movement pattern information item 1-4" based on a factor other than the random number.

After the processing of Step S102 has been executed, the control unit 14 (first game character control section 94) acquires the movement pattern information selected in Step S102 from the movement pattern table, and causes the player character X to start moving according to the movement pattern information (S103).

For example, the control unit 14 sets the movement target position, the moving direction, a moving path, and the like of the player character X based on the movement pattern information selected in Step S102. Then, the control unit 14 keeps updating the position of the player character X based on the movement target position, the moving direction, the moving path, and the like that have been set. As a result, the player character X moves according to the movement pattern information selected in Step S102.

After the processing of Step S103 has been executed, the control unit 14 (relationship information acquiring section 90) acquires the value of the cooperativeness parameter associated with the combination of the player character X and the player character Y from the cooperativeness parameter table (S104). Then, the control unit 14 (second selecting section 92) selects any one of the movement pattern information items associated with the situation condition Z based on the selection result obtained in Step S102 and the value of the cooperativeness parameter obtained in Step S104 (S105).

Figure 13:
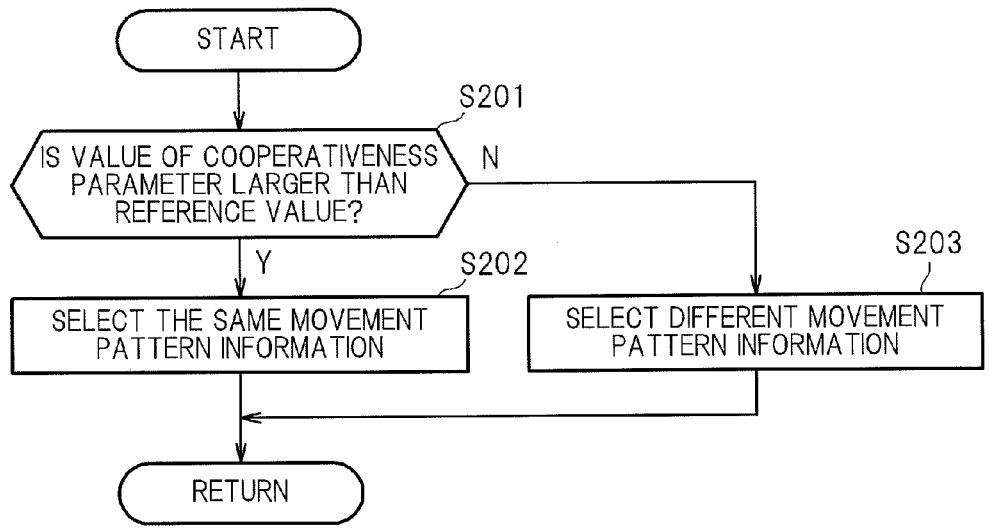
FIG. 13 is a flowchart illustrating an example of processing executed by the game device.

FIG. 13 is a flowchart illustrating an example of processing executed in Step S105. As illustrated in FIG. 13, first, the control unit 14 judges whether or not a value (p) of the cooperativeness parameter acquired in Step S104 is larger than the reference value (Pr) (S201).

If the value (p) of the cooperativeness parameter is larger than the reference value (Pr), the control unit 14 selects the same movement pattern information as the movement pattern information acquired in Step S102 from among the movement pattern information items associated with the situation condition Z (S202). For example, if the situation condition Z corresponds to the "situation condition 1" and if the movement pattern information acquired in Step S102 is the "movement pattern information item 1-1", the control unit 14 selects the "movement pattern information item 1-1".

On the other hand, if the value (p) of the cooperativeness parameter is not larger than the reference value (Pr), the control unit 14 selects any one of the movement pattern information items different from the movement pattern information acquired in Step S102 from among the movement pattern information items associated with the situation condition Z (S203).

For example, if the situation condition Z corresponds to the "situation condition 1" and if the movement pattern information acquired in Step S102 is the "movement pattern information item 1-1", the control unit 14 randomly selects any one of "movement pattern information item 1-2" to the "movement pattern information item 1-4" other than the "movement pattern information item 1-1" based on the random number. Note that the control unit 14 may select any one of the "movement pattern information item 1-2" to the "movement pattern information item 1-4" based on a factor other than the random number.

After the processing of Step S202 or S203 has been executed, the control unit 14 terminates the processing, and executes the processing of Step S106 illustrated in FIG. 12.

Figure 14:
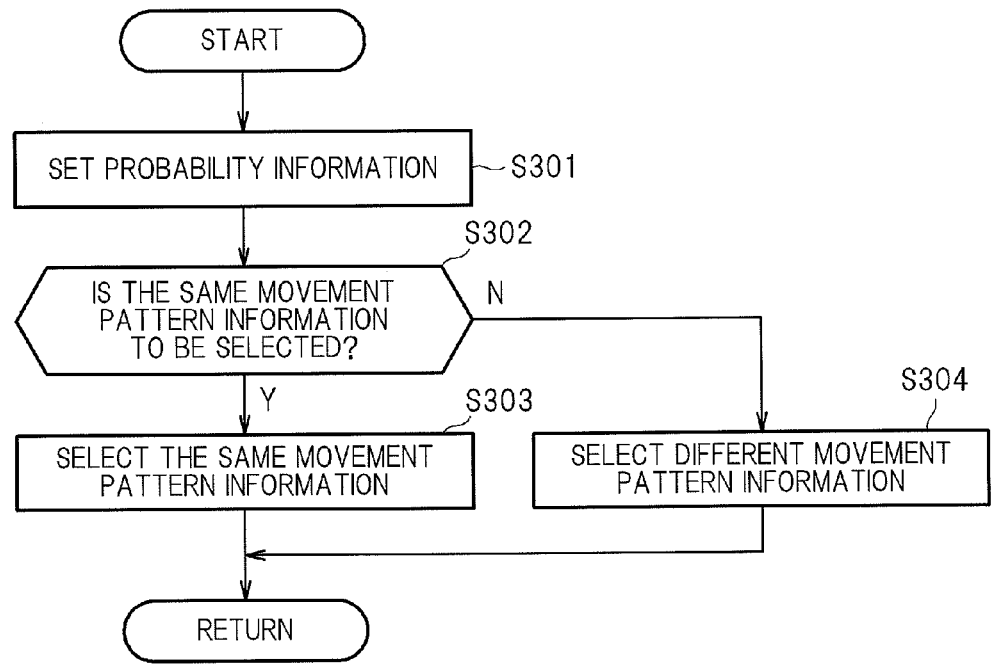
FIG. 14 is a flowchart illustrating an example of processing executed by the game device.

Note that the processing executed in Step S105 is not limited to the processing illustrated in FIG. 13. FIG. 14 is a flowchart illustrating another example of the processing executed in Step S105.

In the processing illustrated in FIG. 14, first, the control unit 14 sets the probability information based on the value (p) of the cooperativeness parameter acquired in Step S104 (S301). Here, the "probability information" is information representing, for example, the probability that the same movement pattern information as the movement pattern information acquired in Step S102 is selected.

For example, the control unit 14 sets the probability information based on the value (p) of the cooperativeness parameter acquired in Step S104 and the probability setting table illustrated in FIG. 9. That is, the control unit 14 acquires the probability P1 associated with the value (p) of the cooperativeness parameter acquired in Step S104 from the probability setting table. Note that, as described above, the probability P1 is the probability that the same movement pattern information as the movement pattern information selected in Step S102 is selected.

After the processing of Step S301 has been executed, the control unit 14 determines, based on the probability information (probability P1) set in Step S301, whether or not to select the same movement pattern information as the movement pattern information selected in Step S102 (S302).

If it is determined that the same movement pattern information as the movement pattern information selected in Step S102 is to be selected, the control unit 14 selects the same movement pattern information as the movement pattern information selected in Step S102 from among the movement pattern information items associated with the situation condition Z (S303). For example, if the situation condition Z corresponds to the "situation condition 1" and if the movement pattern information acquired in Step S102 is the "movement pattern information item 1-1", the control unit 14 selects the "movement pattern information item 1-1".

On the other hand, if it is determined that the same movement pattern information as the movement pattern information selected in Step S102 is not to be selected, the control unit 14 selects the movement pattern information different from the movement pattern information selected in Step S102 from among the movement pattern information items associated with the situation condition Z (S304).

For example, if the situation condition Z corresponds to the "situation condition 1" and if the movement pattern information acquired in Step S102 is the "movement pattern information item 1-1", the control unit 14 randomly selects any one of "movement pattern information item 1-2" to the "movement pattern information item 1-4" other than the "movement pattern information item 1-1" based on the random number. Note that the control unit 14 may select any one of the "movement pattern information item 1-2" to the "movement pattern information item 1-4" based on a factor other than the random number.

After the processing of Step S303 or S304 has been executed, the control unit 14 terminates the processing, and executes the processing of Step S106 illustrated in FIG. 12.

In Step S106 of FIG. 12, the control unit 14 acquires the pass target position of the player character Y based on the movement pattern information selected in Step S105 (S106).

For example, assuming that the player character X is caused to move according to the movement pattern information selected in Step S105, the control unit 14 acquires the movement target position of the player character X in that case. The movement target position is acquired based on the movement pattern information selected in Step S105 and the current position of the player character X. Then, the control unit 14 acquires the pass target position of the player character Y based on the movement target position thus acquired. For example, the control unit 14 acquires the movement target position itself as the pass target position. Alternatively, as the pass target position, the control unit 14 may determine the position obtained by shifting the movement target position randomly based on the random number.

After the processing of Step S106 has been executed, the control unit 14 causes the player character Y to perform a pass to the pass target position acquired in Step S106 (S107). For example, the control unit 14 causes the player character Y to perform the pass action by reproducing the motion data on the pass action (that is, changing the posture of the player character Y based on the motion data on the pass action).

Further, in Step S107, the control unit 14 causes the ball 56 to move toward the pass target position acquired in Step S106. For example, the control unit 14 sets the movement target position, the moving direction, the moving path, and the like of the ball 56 based on the pass target position acquired in Step S106. Then, the control unit 14 keeps updating the position of the ball 56 based on the movement target position, the moving direction, the moving path, and the like that have been set. As a result, the ball 56 moves toward the pass target position acquired in Step S106.

Note that if it is judged in Step S101 that the situation of the player character X satisfies none of the situation conditions stored in the movement pattern table, the control unit 14 acquires the current position of the player character X as the pass target position (S108). Then, the control unit 14 causes the player character Y to perform a pass to the pass target position acquired in Step S108 (S107).

According to the game device 10 described above, it is possible to cause the user to realize that the cooperative action (cooperative play) between the player characters 52 is performed sometimes smoothly and sometimes not smoothly depending on the relationship (for example, cooperativeness or congeniality) between the player characters 52.

Note that in order to cause the player character 52b to fail to perform a pass to the player character 52c in the situation as illustrated in FIG. 3, there may be a method of acquiring a position displaced from the movement target position based on the movement target position of the player character 52c and causing the player character 52b to perform the pass to the acquired position.

However, in this case, the user may feel that the pass to the player character 52c has failed due to low passing ability of the player character 52b that performs the pass, and probably does not feel that the pass to the player character 52c has failed due to insufficient communication between the player character 52b and the player character 52c.

In this respect, the game device 10 is configured to cause the player character 52b to perform a pass to a position different from the movement target position of the player character 52c in consideration of the movement pattern that can be adopted by the player character 52c that is to receive the pass. As a result, it is possible to cause the user to feel that the pass to the player character 52c has failed due to insufficient communication between the player character 52b and the player character 52c.

Note that the present invention is not limited to the embodiment described above.

(1) Note that the first game character control section 94 may cause the player character 52c to move according to the movement control information selected by the second selecting section 92. Further, the second game character control section 96 may cause the player character 52b to perform the action for moving the ball 56 toward the target position determined based on the movement control information selected by the first selecting section 88.

In this case, in the processing illustrated in FIG. 12, the processing of Steps S102, S103, S104, S105, and S106 may be performed in order of Steps S102, S104, S105, S103, and S106.

Further, in this case, in Step S103, the player character X may be caused to start moving according to the movement pattern information selected in Step S105. Further, in Step S106, the pass target position of the player character Y may be acquired based on the movement pattern information selected in Step S102.

(2) Further, for example, after the processing of Step S107 illustrated in FIG. 12 has been executed, the control unit 14 (comparing means) may compare the selection result obtained in Step S102 and the selection result obtained in Step S105. For example, the control unit 14 may judge whether or not the movement pattern information selected in Step S102 and the movement pattern information selected in Step S105 are the same as each other.

Then, the control unit 14 (game processing execution means) may execute game processing based on a result of the above-mentioned comparison. Here, the "game processing" represents, for example, processing for causing at least one of the player character X and the player character Y to perform a specific action or processing for updating the value of the cooperativeness parameter associated with the combination of the player character X and the player character Y. Note that the "game processing" may be processing for displaying a predetermined image on the game screen 60 or processing for outputting a predetermined sound from the audio output unit 34.

For example, the case where the movement pattern information selected in Step S102 and the movement pattern information selected in Step S105 are different from each other indicates a case where the communication has failed between the player character X and the player character Y with the result that the player character Y has performed a pass to a position other than the movement target position of the player character X. In this case, the control unit 14 may cause at least one of the player character X and the player character Y to perform a specific action based on the motion data on the specific action. For example, the control unit 14 may cause at least one of the player character X and the player character Y to perform an action indicating anger or an action indicating apology.

Further, for example, the case where the movement pattern information selected in Step S102 and the movement pattern information selected in Step S105 are the same as each other indicates a case where the communication between the player character X and the player character Y has been successful with the result that the player character Y has performed a pass to the movement target position of the player character X. In this case, the control unit 14 may update the value of the cooperativeness parameter associated with the combination of the player character X and the player character Y so as to raise the cooperativeness or congeniality between the player character X and the player character Y.

(3) Further, for example, the game space may be a two-dimensional game space in which the positions and the like of player characters and a ball are managed by two coordinate elements.

(4) Further, for example, the present invention can be applied to the game device 10 for executing a sports game other than the soccer game. For example, the present invention can also be applied to the game device 10 for executing a basketball game, an ice hockey game, an American football game, or the like.

(5) While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game configured such that a plurality of game characters perform a competitive sport using a moving object, the game device comprising:

first selecting means for selecting one of a plurality of movement control information items stored in a movement control information storage for storing the plurality of movement control information items for controlling at least one of a movement target position and a moving direction of a game character;

relationship information acquiring means for acquiring relationship information associated with a combination of a first game character and a second game character in possession of the moving object, from a relationship information storage for storing the relationship information indicating a level of cooperativeness or congeniality between game characters in association with the combination of the game characters;

second selecting means for selecting one of the plurality of movement control information items based on a selection result obtained by the first selecting means and the relationship information acquired by the relationship information acquiring means;

first game character control means for causing the first game character to move based on the one of the plurality of movement control information items that has been selected by one of the first selecting means and the second selecting means; and second game character control means for causing, in a case where the first game character is caused to move based on the one of the plurality of movement control information items that has been selected by one of the first selecting means and the second selecting means, the second game character to perform an action for moving the moving object toward a target position determined based on the one of the plurality of movement control information items that has been selected by the other one of the first selecting means and the second selecting means.

2. The game device according to claim 1, wherein
the movement control information storage stores one or more movement control information items in association with each of a plurality of game situation conditions,
the first selecting means selects one of the plurality of movement control information items associated with a game situation condition that is satisfied by the situation of the first game character, and
the second selecting means selects one of the plurality of movement control information items associated with the game situation condition.

3. The game device according to claim 1, wherein the first game character and the second game character are on a same team of a plurality of teams within the game.

4. The game device according to claim 1, wherein the second selecting means selects the one of the plurality of movement control information items according to whether the relationship information satisfies a predetermined condition.

5. The game device according to claim 1, wherein the second selecting means selects the one of the plurality of movement control information items according to probability information based on the selection result obtained by the first selecting means and the relationship information acquired by the relationship information acquiring means.

6. A game device for executing a game configured such that a plurality of game characters perform a competitive sport using a moving object, the game device comprising:
first selecting means for selecting one of a plurality of movement control information items stored in a movement control information storage for storing the plurality of movement control information items for controlling at least one of a movement target position and a moving direction of a game character;
relationship information acquiring means for acquiring relationship information associated with a combination of a first game character and a second game character in possession of the moving object, from a relationship information storage for storing the relationship information on a relationship between game characters in association with the combination of the game characters;

second selecting means for selecting one of the plurality of movement control information items based on a selection result obtained by the first selecting means and the relationship information acquired by the relationship information acquiring means;

first game character control means for causing the first game character to move based on the one of the plurality of movement control information items that has been selected by one of the first selecting means and the second selecting means; and second game character control means for causing, in a case where the first game character is caused to move based on the one of the plurality of movement control information items that has been selected by one of the first selecting means and the second selecting means, the second game character to perform an action for moving the moving object toward a target position determined based on the one of the plurality of movement control information items that has been selected by the other one of the first selecting means and the second selecting means, wherein the second selecting means comprises:

means for judging whether or not the relationship information associated with the combination of the first game character and the second game character satisfies a predetermined condition;

means for selecting, if the predetermined condition is judged to be satisfied, the same one of the plurality of movement control information items as the one of the plurality of movement control information items that has been selected by the first selecting means, from among the plurality of movement control information items; and means for selecting, if the predetermined condition is not judged to be satisfied, any one of the plurality of movement control information items different from the one of the plurality of movement control information items that has been selected by the first selecting means, from among the plurality of movement control information items.

7. A game device for executing a game configured such that a plurality of game characters perform a competitive sport using a moving object, the game device comprising:
first selecting means for selecting one of a plurality of movement control information items stored in a movement control information storage for storing the plurality of movement control information items for controlling at least one of a movement target position and a moving direction of a game character;
relationship information acquiring means for acquiring relationship information associated with a combination of a first game character and a second game character in possession of the moving object, from a relationship information storage for storing the relationship information on a relationship between game characters in association with the combination of the game characters;

second selecting means for selecting one of the plurality of movement control information items based on a selection result obtained by the first selecting means and the relationship information acquired by the relationship information acquiring means;

first game character control means for causing the first game character to move based on the one of the plurality of movement control information items that has been selected by one of the first selecting means and the second selecting means; and second game character control means for causing, in a case where the first game character is caused to move based on the one of the plurality of movement control information items that has been selected by one of the first selecting means and the second selecting means, the second game character to perform an action for moving the moving object toward a target position determined based on the one of the plurality of movement control information items that has been selected by the other one of the first selecting means and the second selecting means, wherein the second selecting means comprises:

means for selecting one of the plurality of movement control information items based on probability information; and means for setting the probability information based on the relationship information associated with the combination of the first game character and the second game character, by setting a probability that the same one of the plurality of movement control information items as the one of the plurality of movement control information items selected by the first selecting means is selected, based on the relationship information associated with the combination of the first game character and the second game character.

8. A game device for executing a game configured such that a plurality of game characters perform a competitive sport using a moving object, the game device comprising:

first selecting means for selecting one of a plurality of movement control information items stored in a movement control information storage for storing the plurality of movement control information items for controlling at least one of a movement target position and a moving direction of a game character;

relationship information acquiring means for acquiring relationship information associated with a combination of a first game character and a second game character in possession of the moving object, from a relationship information storage for storing the relationship information on a relationship between game characters in association with the combination of the game characters;

second selecting means for selecting one of the plurality of movement control information items based on a selection result obtained by the first selecting means and the relationship information acquired by the relationship information acquiring means;

first game character control means for causing the first game character to move based on the one of the plurality of movement control information items that has been selected by one of the first selecting means and the second selecting means;

second game character control means for causing, in a case where the first game character is caused to move based on the one of the plurality of movement control information items that has been selected by one of the first selecting means and the second selecting means, the second game character to perform an action for moving the moving object toward a target position determined based on the one of the plurality of movement control information items that has been selected by the other one of the first selecting means and the second selecting means;

comparing means for comparing the selection result obtained by the first selecting means and a selection result obtained by the second selecting means; and game processing execution means for executing game processing based on a comparison result obtained by the comparing means.

9. A method of controlling a game device for executing a game configured such that a plurality of game characters perform a competitive sport using a moving object, the method comprising:

a first selecting step of selecting one of a plurality of movement control information items stored in movement control information storage for storing the plurality of movement control information items for controlling at least one of a movement target position and a moving direction of a game character;

a relationship information acquiring step of acquiring relationship information associated with a combination of a first game character and a second game character in possession of the moving object, from a relationship information storage for storing the relationship information indicating a level of cooperativeness or congeniality between game characters in association with the combination of the game characters;

a second selecting step of selecting one of the plurality of movement control information items based on a selection result obtained in the first selecting step and the relationship information acquired in the relationship information acquiring step;

a first game character control step of causing the first game character to move based on the one of the plurality of movement control information items that has been selected in one of the first selecting step and the second selecting step; and a second game character control step of causing, in a case where the first game character is caused to move based on the one of the plurality of movement control information items that has been selected in one of the first selecting step and the second selecting step, the second game character to perform an action for moving the moving object toward a target position determined based on the one of the plurality of movement control information items that has been selected in the other one of the first selecting step and the second selecting step.

10. A non-transitory computer-readable information storage medium storing a program, the program causing a computer to function as a game device for executing a game configured such that a plurality of game characters perform a competitive sport using a moving object, the program further causing the computer to:

select, in a first selection, one of a plurality of movement control information items stored in a movement control information storage for storing the plurality of movement control information items for controlling at least one of a movement target position and a moving direction of a game character;

acquire relationship information associated with a combination of a first game character and a second game character in possession of the moving object, from a relationship information storage for storing the relationship information indicating a level of cooperativeness or congeniality between game characters in association with the combination of the game characters;

select, in a second selection, one of the plurality of movement control information items based on the first selection and the acquired relationship information;

cause the first game character to move based on the one of the plurality of movement control information items that has been selected in one of the first selection and the second selection; and cause, in a case where the first game character is caused to move based on the one of the plurality of movement control information items that has been selected in one of the first selection and the second selection, the second game character to perform an action for moving the moving object toward a target position determined based on the one of the plurality of movement control information items that has been selected in the other one of the first selection and the second selection.

11. A method of controlling a game device for executing a game configured such that a plurality of game characters perform a competitive sport using a moving object, the method comprising:
- a first selecting step of selecting one of a plurality of movement control information items stored in a storage that stores the plurality of movement control information items for controlling at least one of a movement target position and a moving direction of a game character;
- a relationship information acquiring step of acquiring relationship information associated with a combination of a first game character and a second game character in possession of the moving object, from a storage that stores the relationship information on a relationship between game characters in association with the combination of the game characters;
- a second selecting step of selecting one of the plurality of movement control information items based on a selection result obtained in the first selecting step and the relationship information acquired in the relationship information acquiring step;
- a first game character control step of causing the first game character to move based on the one of the plurality of movement control information items that has been selected in one of the first selecting step and the second selecting step; and
- a second game character control step of causing, in a case where the first game character is caused to move based on the one of the plurality of movement control information items that has been selected in one of the first selecting step and the second selecting step, the second game character to perform an action for moving the moving object toward a target position determined based on the one of the plurality of movement control information items that has been selected in the other one of the first selecting step and the second selecting step, wherein the second selecting step comprises:
- a step of judging whether or not the relationship information associated with the combination of the first game character and the second game character satisfies a predetermined condition;
- a step of selecting, if the predetermined condition is judged to be satisfied, the same one of the plurality of movement control information items as the one of the plurality of movement control information items that has been selected in the first selecting step, from among the plurality of movement control information items; and
- a step of selecting, if the predetermined condition is not judged to be satisfied, one of the plurality of movement control information items different from the one of the plurality of movement control information items that has been selected in the first selecting step, from among the plurality of movement control information items.

* * * * *